US010837356B2

(12) United States Patent
Hyseni

(10) Patent No.: US 10,837,356 B2
(45) Date of Patent: Nov. 17, 2020

(54) FREE-PISTON LINEAR APPARATUS

(71) Applicant: Kujtim Hyseni, Halmstad (SE)

(72) Inventor: Kujtim Hyseni, Halmstad (SE)

( * ) Notice: Subject to any disclaimer, the term of this patent is extended or adjusted under 35 U.S.C. 154(b) by 0 days.

(21) Appl. No.: 16/474,813

(22) PCT Filed: Dec. 29, 2017

(86) PCT No.: PCT/EP2017/084836
§ 371 (c)(1),
(2) Date: Jun. 28, 2019

(87) PCT Pub. No.: WO2018/122386
PCT Pub. Date: Jul. 5, 2018

(65) Prior Publication Data
US 2019/0345871 A1    Nov. 14, 2019

(30) Foreign Application Priority Data

Dec. 30, 2016 (EP) ..................................... 16207493

(51) Int. Cl.
*F02B 71/00* (2006.01)
*F02B 71/04* (2006.01)
(Continued)

(52) U.S. Cl.
CPC ............ *F02B 71/04* (2013.01); *F02B 63/041* (2013.01); *F01B 11/007* (2013.01); *F01B 23/10* (2013.01); *F02B 2043/106* (2013.01); *F02G 5/02* (2013.01)

(58) Field of Classification Search
CPC .. F01B 11/007; F01B 23/10; F02B 2043/106; F02B 43/10; F02B 63/041; F02B 71/04;
(Continued)

(56) References Cited

U.S. PATENT DOCUMENTS

| 4,154,200 A | 5/1979 | Jarret et al. |
| 4,413,475 A * | 11/1983 | Moscrip ................ F02G 1/0435 |
| | | 60/517 |

(Continued)

FOREIGN PATENT DOCUMENTS

| DE | 102014100545 A1 | 7/2015 |
| WO | 2007035084 A1 | 3/2007 |

OTHER PUBLICATIONS

International Search Report (PCT/ISA/210) and Written Opinion (PCT/ISA/237) dated May 3, 2018, by the European Patent Office as the International Searching Authority for International Application No. PCT/EP2017/084836.

*Primary Examiner* — George C Jin
*Assistant Examiner* — Teuta B Holbrook
(74) *Attorney, Agent, or Firm* — Buchanan Ingersoll & Rooney P.C.

(57) ABSTRACT

The present invention relates to a free-piston linear apparatus, comprising a piston arranged within a cylinder, said piston being configured for linear displacement within the cylinder; a combustion chamber arranged on one side of said piston and a gas expansion chamber arranged on an opposite side of said piston, wherein said piston is drivable under the action of a fuel medium expanding in the combustion chamber; an exhaust vent arranged to release exhaust gas from the combustion chamber to an exhaust system, wherein said exhaust system comprises a heat exchanger configured to transfer residual heat from said exhaust gas to said gas expansion chamber in order to heat the gas expansion chamber; and wherein said gas expansion chamber comprises at least one gas port for injecting and/or releasing gas into/from the gas expansion chamber.

12 Claims, 6 Drawing Sheets

(51) Int. Cl.
*F02B 63/04* (2006.01)
*F01B 11/00* (2006.01)
*F01B 23/10* (2006.01)
*F02B 43/10* (2006.01)
*F02G 5/02* (2006.01)

(58) Field of Classification Search
CPC .......... F02B 71/00; F02G 5/02; F02G 1/0435; F02G 1/043; F02G 1/044; F02G 1/055; F02G 2244/12
See application file for complete search history.

(56) References Cited

U.S. PATENT DOCUMENTS

| | | |
|---|---|---|
| 2005/0081804 A1 | 4/2005 | Graf et al. |
| 2013/0005200 A1* | 1/2013 | Mayburd ................ G21D 7/00 440/18 |

* cited by examiner

FREE-PISTON LINEAR APPARATUS

TECHNICAL FIELD OF THE INVENTION

The present invention relates to a free-piston linear apparatus, and more specifically to a high-efficiency free-piston linear apparatus.

BACKGROUND

Free-piston linear apparatuses (or free-piston linear generators) are widely known in the art. In short, it can be said that a free-piston linear apparatus is a free-piston engine coupled to a linear alternator which converts chemical energy from fuel into electric energy, e.g. as described in U.S. Pat. No. 4,154,200. Such generators can for example be used in stationary applications as current generating units, however, due to their low weight and good efficiency they are also suitable for mobile applications such as range extenders for electric or hybrid vehicles.

Free-piston linear generators have many advantages over more traditional electric generators coupled to an internal combustion engine. Some of these advantages of free-piston linear apparatuses are for example, that the configuration of the piston displacement is that of a free-piston displacement, thus removing the need for crankshafts, and the variable compression ratio of free-piston linear apparatuses, which makes them compatible with different kinds of fuel, e.g. gasoline, diesel, natural gas, biofuel, hydrogen, etc.

However, there is still a need for further improvements of the free-piston linear generator and it is particularly desirable to further increase their efficiency.

SUMMARY OF THE INVENTION

It is accordingly an object of the present invention to provide a free-piston linear apparatus and a method for operating a free-piston linear apparatus which alleviates all or at least some of the drawbacks associated with presently known apparatuses. More specifically, it is an object of the present invention to provide a free-piston linear apparatus that is more energy efficient than presently known systems.

This object is achieved by means of a free-piston linear apparatus and a method for operating a free-piston linear apparatus as defined in the appended claims.

According to a first aspect of the present invention, there is provided a free-piston linear apparatus, comprising:

a piston arranged within a cylinder, the piston being configured for linear displacement within the cylinder;

a combustion chamber arranged on one side of the piston and a gas expansion chamber arranged on an opposite side of the piston, wherein the piston is drivable under the action of a fuel medium expanding in the combustion chamber;

an exhaust vent arranged to release exhaust gas from the combustion chamber to an exhaust system, wherein the exhaust system comprises a heat exchanger configured to transfer residual heat from the exhaust gas to the gas expansion chamber in order to heat the gas expansion chamber; and wherein the gas expansion chamber comprises at least one gas port for injecting and/or releasing gas into/from the gas expansion chamber.

Hereby, a free-piston linear apparatus having a higher energy efficiency as compared to prior known systems is presented. In more detail, the inventive free-piston linear apparatus is capable of utilizing the otherwise wasted energy in the residual exhaust gas from the combustion process, in order to further increase the efficiency of the apparatus.

The term exemplary is in the present context to be construed as serving as an example, instance, or illustration.

A piston can in the context of the present application be understood as a part of the apparatus which moves reciprocally against a fluid medium within a cylinder housing. The piston can accordingly include a rod and one or two heads depending on the intended application and overall configuration of the apparatus. In other words, a "piston" may be construed as a "piston assembly" comprising a rod and one or more piston heads. However, the terms "piston" and "cylinder" as well as some of the other terms us in the following are considered to be readily known and understood by the skilled artisan and will for the sake of brevity not be further discussed.

Moreover, in the present context a "cycle" is to be understood as a full reciprocal movement of the piston within the cylinder, i.e. a forward and backward stroke away from the combustion chamber and back towards the combustion chamber. Thus, a "half cycle" is accordingly considered to include only the forward stroke or the backward stroke of the piston within the cylinder.

Further, the gas expansion chamber can be said to act as a gas spring chamber due to the air or gas contained therein being compressed by the movement of the piston.

The present invention is based on the realization that by providing an exhaust system in a free-piston linear apparatus having a suitably arranged heat exchanger, the efficiency of the piston movement as well as the energy utilization ratio of the free-piston linear apparatus can be increased. The heat exchanger is preferably arranged approximate to the gas expansion chamber and configured to transfer heat to at least one wall of the gas expansion chamber. The heat exchanger may additionally or alternatively be arranged partly or completely inside the gas expansion chamber.

In more detail, the apparatus can be arranged such that a gaseous medium is injected into the "preheated" gas expansion chamber after a first half cycle where the piston has been pushed away from the combustion chamber, whereby the gas medium expands within the gas expansion chamber and accordingly forces the piston back towards the combustion chamber in a second half cycle. Additionally, the now heated gas medium can be transported from the gas expansion chamber into the combustion chamber for combustion in a subsequent half cycle whereby the "same" amount of gas medium is utilized for moving the piston again. In other words, a defined or limited amount of gas is used twice during a full cycle (two half cycles) of the apparatus.

Additionally or alternatively, the gas expansion chamber and/or the heat exchanger may be connected to an external source of heat. Thus, waste head from other components than those comprised by the free-piston linear apparatus of the present invention may be utilized in pre-heating the gas expansion chamber. Examples of such external heat sources may be a reformer, for example a steam reformer or a steam methane reformer. Additionally or alternatively, said heat exchanger may be coupled to said reformer. Thus, heat and energy needed to produce hydrogen may be provided at least partly by the free-piston linear apparatus.

According to one exemplary embodiment, said gas expansion chamber and said combustion chamber may be connected by means of a channel extending through said piston. Said channel extending through said piston may comprise a controllable valve, and may therefore function similarly to the gas outlet and the second channel of the present invention.

The free-piston linear apparatus may be operated with different fuels, such as e.g. hydrogen, or natural gas. Accordingly, the free-piston linear apparatus may comprise a liquid fuel tank, i.e. a tank for liquid fuel, e.g. diesel, gasoline, or ethanol, which is connected to the combustion chamber. However, the free-piston linear apparatus may alternatively, or additionally, comprise a hydrogen storage tank connected to the gas expansion chamber and to the combustion chamber. Moreover, the gas expansion chamber may be provided with a gas inlet and a gas outlet for supplying and releasing gas into/from the gas expansion chamber.

Furthermore, the heat exchanger may, in accordance with an embodiment of the present invention, be connected to an external heat source. Thus, waste heat from other processes than the fuel combusting inside the fuel combustion chamber may be utilized to heat or preheat the gas expansion chamber.

Furthermore, the free-piston linear apparatus may, in accordance with an embodiment of the present invention, comprise a pair of opposed pistons arranged on opposite sides of the combustion chambers and sharing a common axis along which both pistons move reciprocally. In more detail, the apparatus has a piston which is a first piston arranged in a first cylinder, and a gas expansion chamber which is a first gas expansion chamber, and wherein the free-piston linear apparatus further comprises:
  a second piston arranged within a second cylinder such that the first piston and second piston together form a pair of opposed pistons arranged on opposite sides of the combustion chamber, each piston being configured for linear displacement within a corresponding cylinder (which may be a common cylinder), the pair of opposed pistons being drivable under the action of a fuel medium expanding in the combustion chamber; and
  a second gas expansion chamber arranged on an opposite side of the second piston relative to the combustion chamber, wherein the exhaust system further comprises a second heat exchanger configured to transfer residual heat from the exhaust gas to the second gas expansion chamber in order to heat the second gas expansion chamber, and wherein each of the first and second gas expansion chambers comprises at least one gas port for injecting and/or releasing gas into/from the gas expansion chamber.

Even further, in accordance with another exemplary embodiment, the free-piston linear apparatus may further comprise a pressure equalization channel connecting the first gas expansion chamber with the second gas expansion chamber. The pressure equalization chamber may be arranged such that the pressure may be equalized between the first and the second gas expansion chamber. By ensuring that the pressure in each gas expansion chamber is equal to that of the other, synchronicity of the movement of the two pistons is achieved. If the pressure from one gas expansion chamber is greater than that from the other, the first piston may move faster towards the combustion chamber than the other piston, thus causing an imbalance of the free-piston linear arrangement.

Even though the opposing piston pair are arranged on opposite sides of the combustion chamber above, it is envisioned that the apparatus may be arranged such that the opposing pistons are arranged on opposite sides of a common gas expansion chamber and accordingly have individual combustion chambers arranged on the opposite sides of each piston relative to the common gas expansion chamber. Thus, in this alternative embodiment, with a common gas expansion chamber, the exhaust system can be arranged to have one heat exchanger instead of at least two.

Further, in accordance with another embodiment of the present invention, the piston comprises a piston rod, and wherein the free-piston linear apparatus further comprises:
  a linear generator arrangement comprising:
    a set of stator windings arranged around the path of linear displacement, and
    at least one magnetic element mounted to said piston rod in order to induce a current into said stator windings during said linear displacement of said piston.

In other words, the free-piston linear apparatus can be operated as a free-piston linear generator, where the reciprocal movement of the piston is utilized for inducing a current in a set of stator windings suitably arranged around the path of linear displacement. Furthermore, in alternative embodiments the piston rod may be arranged to include magnetized sections or portions along a length of the piston rod, i.e. the piston rod may have integrated magnets. Also, the placement of the stator windings and the magnetic element(s) may be interchangeable, i.e. the piston rod may be provided with a winding structure while the magnetic elements may be arranged around the path of linear displacement. The windings can in such embodiments be supplied with a current by using e.g. slip rings or brushes.

Further, in accordance with yet another embodiment of the present invention, the gas expansion chamber is connected to:
  the hydrogen storage tank via the gas inlet, and
  the combustion chamber via the gas outlet;
wherein the free-piston linear apparatus is arranged such that hydrogen is transported into the heated gas expansion chamber, in which the hydrogen expands, and wherein the hydrogen is subsequently transported into the combustion chamber, in which the hydrogen is combusted.

In other words, the hydrogen storage tank is connected to the gas expansion chamber via the gas inlet, and wherein the gas expansion chamber is connected to the combustion chamber via the gas outlet in order to e.g. transport hydrogen gas from the hydrogen storage tank to the combustion chamber via the gas expansion chamber.

Furthermore, and in accordance with yet another embodiment of the present invention, the free-piston linear apparatus further comprises a bypass path from said gas inlet to said gas outlet such that hydrogen gas can be transported directly from said hydrogen tank to said combustion chamber and thereby bypass the gas expansion chamber. The gas expansion chamber may accordingly comprise a control valve in each of the gas inlet and gas outlet. The control valve may for example be in the form of T-ports with a 3-way ball valve in order to control the flow path of the hydrogen gas. The bypass path can advantageously be used for a pure hydrogen drive but before the gas expansion chamber has reached a desired temperature.

Yet further, and in accordance with another embodiment of the present invention the free-piston linear apparatus further comprises:
  a temperature sensor configured to determine a temperature of the gas expansion chamber; and
  a control unit configured to control an injection of hydrogen gas from the hydrogen storage tank into the gas expansion chamber based on at least one of an input from a user, the temperature of the gas expansion chamber, and a position of the piston. The control unit is preferably a microprocessor any other equivalent type of computing device, and may be realized as a software controlled processor. However, the controller may alternatively be realized wholly or partly in hardware. For example, the control unit may be configured to control an injection of hydrogen gas into the gas expansion chamber from the hydrogen storage tank once the temperature of the gas expansion chamber is above a predetermined threshold value. Thus, once the temperature of the gas expansion chamber reaches a certain value the injected hydrogen gas will be heated upon entry, which increase the pressure inside the gas expansion chamber and consequently the power output of the free-piston linear apparatus.

Further, in accordance with another embodiment of the present invention, the free-piston linear apparatus further comprises cooling means arranged to cool hydrogen gas exiting the gas expansion chamber. The cooling means may for example be heatsink or a second heat exchanger connected to a cooling medium. The hydrogen exiting the gas expansion chamber may have been expanded due to being heated by the heat exchanger. Thus, providing the second channel with cooling elements allows the hydrogen to be cooled, thereby causing its density to increase. As the density of the hydrogen increases, the energy density of the hydrogen that fits inside the combustion chamber increases as well. This allows for a more efficient combustion.

According to another aspect of the present invention there is provided a method for operating a free-piston linear apparatus according to any embodiment of the first aspect of the invention. The method comprises:

injecting a fuel medium into the combustion chamber and causing the fuel medium to expand in a combustion reaction within the combustion chamber in order to drive the piston toward the gas expansion chamber;

releasing residual exhaust gas from the combustion chamber via the exhaust system;

injecting hydrogen gas into the gas expansion chamber whereby the hydrogen gas is heated by the residual exhaust gas via the heat exchanger of the exhaust system and caused to expand within the gas expansion chamber in order to drive the piston back toward the combustion chamber; and transporting hydrogen gas from the gas expansion chamber into the combustion chamber and causing the hydrogen gas to expand in a combustion reaction within the combustion chamber in order to drive the piston toward the gas expansion chamber.

With this aspect of the invention, similar advantages and preferred features are present as in the previously discussed first aspect of the invention. For example, the step of injecting hydrogen gas into the gas expansion chamber may be performed once a temperature of the gas expansion chamber reaches a threshold value. Until then, the hydrogen gas can be injected directly into the combustion chamber, e.g. via the by-pass path until the temperature reaches the threshold value. Alternatively, the hydrogen gas injection can be deferred completely until the temperature is high enough in this case the apparatus may be operated or driven by an alternative fuel medium (e.g. gasoline, diesel, natural gas, ethanol, etc.) until the temperature of the gas expansion chamber is high enough, after which the apparatus may be run on solely hydrogen. The method may also comprise the step of cooling the hydrogen gas as it is transported from the gas expansion chamber to the combustion chamber. Thus, the density of the hydrogen is increased and a more energy dense gas may be combusted inside the combustion chamber. The effectiveness of the free-piston linear apparatus is thereby increased.

Itemized List of Embodiments

Item 1. A free-piston linear apparatus, comprising:
a piston arranged within a cylinder, said piston being configured for linear displacement within the cylinder;
a combustion chamber arranged on one side of said piston and a gas expansion chamber arranged on an opposite side of said piston, wherein said piston is drivable under the action of a fuel medium expanding in the combustion chamber;
an exhaust vent arranged to release exhaust gas from the combustion chamber to an exhaust system, wherein said exhaust system comprises a heat exchanger configured to transfer residual heat from said exhaust gas to said gas expansion chamber in order to heat the gas expansion chamber; and
wherein said gas expansion chamber comprises at least one gas port for injecting and/or releasing gas into/from the gas expansion chamber.

Item 2. The free-piston linear apparatus according to item 1, wherein said piston comprises a piston rod, and wherein said free-piston linear apparatus further comprises:
a linear generator arrangement comprising:
a set of stator windings arranged around the path of linear displacement, and
at least one magnetic element mounted to said piston rod in order to induce a current into said stator windings during said linear displacement of said piston.

Item 3. The free-piston linear apparatus according to any one of the preceding items, wherein said free-piston linear apparatus further comprises a hydrogen storage tank connected to said gas expansion chamber.

Item 4. The free-piston linear apparatus according to item 3, wherein said gas expansion chamber comprises a gas inlet and a gas outlet for supplying and releasing gas into/from the gas expansion chamber.

Item 5. The free-piston linear apparatus according to item 4, wherein said gas expansion chamber is connected to:
said hydrogen storage tank via said gas inlet, and
said combustion chamber via said gas outlet;
wherein said free-piston linear apparatus is arranged such that hydrogen is transported into said heated gas expansion chamber, in which the hydrogen expands, and wherein said hydrogen is subsequently transported into said combustion chamber, in which the hydrogen is combusted.

Item 6. The free-piston linear apparatus according to item 4 or 5, further comprising a by-pass path from said gas inlet to said gas outlet such that hydrogen gas can be transported directly from said hydrogen tank to said combustion chamber and thereby bypass the gas expansion chamber.

Item 7. The free-piston linear apparatus according to any one of items 4-6, wherein each of said gas outlet and said gas inlet comprises a control valve for directing a flow of hydrogen gas.

Item 8. The free-piston linear apparatus according to any one of items 3-7, further comprising:
a temperature sensor configured to determine a temperature of said gas expansion chamber; and
a control unit configured to control an injection of hydrogen gas from said hydrogen storage tank into the gas expansion chamber based on at least one of an input from a user, the temperature of the gas expansion chamber, and a position of the piston.

Item 9. The free-piston linear apparatus according to item 8, wherein said control unit is configured to control an injection of hydrogen gas into the gas expansion chamber from the hydrogen storage tank once the temperature of the gas expansion chamber is above a predetermined threshold value.

Item 10. The free-piston linear apparatus according to any one of the preceding items, further comprising a liquid fuel tank, wherein said liquid fuel tank is connected to said combustion chamber.

Item 11. The free-piston linear apparatus according to any one of the preceding items, wherein said heat exchanger is arranged adjacent to the gas expansion chamber and configured to transfer heat to at least one wall of said gas expansion chamber.

Item 12. The free-piston linear apparatus according to any one of the preceding items, further comprising cooling means arranged to cool hydrogen gas exiting said gas expansion chamber.

Item 13. Method for operating a free piston linear apparatus according to claim any one of items 1-12, said method comprising:

injecting a fuel medium into the combustion chamber and causing the fuel medium to expand in a combustion reaction within the combustion chamber in order to drive said piston toward said gas expansion chamber;

releasing residual exhaust gas from said combustion chamber via said exhaust system;

injecting hydrogen gas into said gas expansion chamber whereby the hydrogen gas is heated by the residual exhaust gas via the heat exchanger of the exhaust system and caused to expand within the gas expansion chamber in order to drive said piston back toward said combustion chamber; and transporting hydrogen gas from said gas expansion chamber into the combustion chamber and causing the hydrogen gas to expand in a combustion reaction within the combustion chamber in order to drive said piston toward the gas expansion chamber.

Item 14. The method according to item 13, wherein the step of injecting hydrogen gas into the gas expansion chamber is performed once a temperature of the gas expansion chamber reaches a threshold value.

Item 15. The method according to item 13 or 14, further comprising the step:

cooling the hydrogen gas as it is transported from the gas expansion chamber to the combustion chamber.

These and other features of the present invention will in the following be further clarified with reference to the embodiments described hereinafter.

BRIEF DESCRIPTION OF THE DRAWINGS

The above, as well as additional objects, features and advantages of the present invention, will be better understood through the following illustrative and non-limiting detailed description of exemplary embodiments of the present invention, with reference to the appended drawing, wherein.

DETAILED DESCRIPTION

In the following detailed description, embodiments of the present invention will be described. However, it is to be understood that features of the different embodiments are exchangeable between the embodiments and may be combined in different ways, unless anything else is specifically indicated. Even though in the following description, numerous specific details are set forth to provide a more thorough understanding of the present invention, it will be apparent to one skilled in the art that the present invention may be practiced without these specific details. In other instances, well known constructions or functions are not described in detail, so as not to obscure the present invention. In illustrations containing a large number of identical or equivalent elements or devices, only a few of the elements/devices will be provided with a reference mark in order to reduce clogging of the figures.

Figure 1:
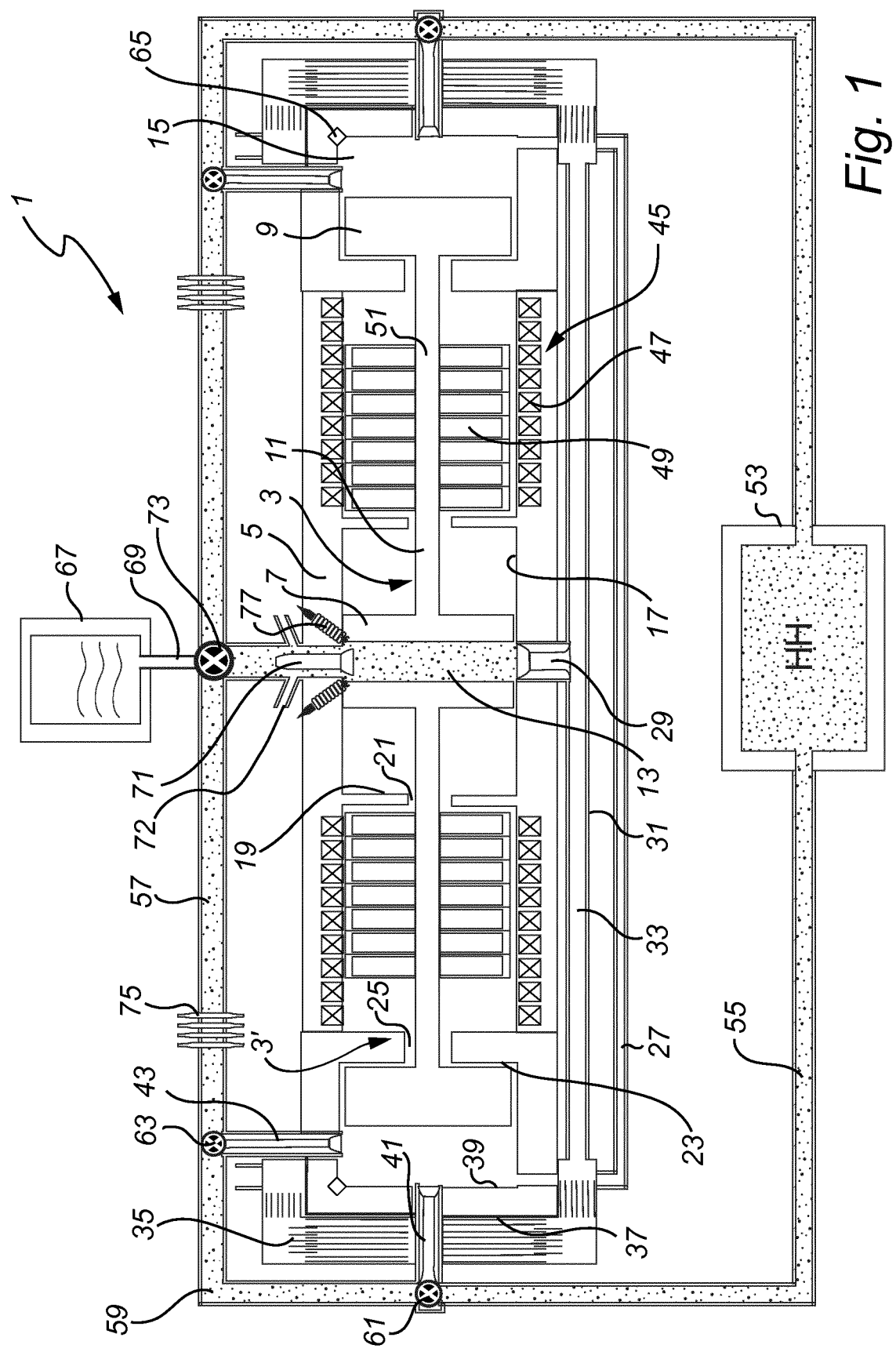
FIG. 1 is a schematic view of a free-piston linear apparatus according to one exemplary embodiment of the present invention.

FIG. 1 shows a free-piston linear apparatus 1 according to an embodiment of the present invention. The free-piston linear apparatus 1 of FIG. 1 is mirror symmetric over a plane of symmetry dividing the combustion chamber 13 in half (separating the two pistons 3, 3'). The following description should be understood as describing one half of the mirror symmetric free-piston linear apparatus 1, however, the skilled person realizes that the description is analogously applicable to the other half of the free-piston linear apparatus 1. The free-piston linear apparatus 1 comprises a piston 3 arranged within a cylinder 5. The piston 3 comprises a first piston head 7, a second piston head 9, and a rod connecting the two piston heads 11. The cylinder 5 is arranged around the piston 3 such that the piston 3 is held within and at least partly enclosed by the cylinder 5. The free-piston linear apparatus 1 further comprises a combustion chamber 13 arranged on one side of said piston and a gas expansion chamber 15 arranged on an opposite side of said piston 3. With reference to the abovementioned mirror symmetry, the free-piston linear apparatus 1 is to be understood as preferably having two cylinders 5, two pistons 3, two gas expansion chambers 15 and one combustion chamber 13 arranged between the two halves of the apparatus 1.

The cross-sectional shape of the first and second piston head 7, 9 is the same as the cross-sectional shape of the inner wall 17 of the cylinder 5, with the size of the piston heads 7, 9 being chosen to ensure a tight fit between the piston heads 7, 9 and the inner walls 17 of the cylinder 5. This ensures that little or no fuel, combustion gas or air escapes the combustion chamber 13 and/or the gas expansion chamber 15 during operation of the free-piston linear apparatus 1. The cylinder 5 and piston 3 are configured to allow linear movement of the piston 3 inside the cylinder 5, in a direction parallel with the longitudinal axis of the piston rod 11. In other words, the piston 3 is drivable under the action of a fuel medium expanding in the combustion chamber 13. The piston 3 may move between two end positions (shown in FIG. 1 and FIG. 2), one being defined by a combustion chamber wall 19 provided with a through hole 21 for the piston rod 11, and the other being defined by a gas expansion chamber wall 23 also provided with a through hole 25 for the piston rod 11. When the piston 3 approaches either one of its two end positions, its speed is reduced by the pressure exerted on the respective piston head 7, 9 from the gas in the two respective chambers 13, 15. As the gas inside the chambers 13, 15 is compressed by the piston heads 7, 9, the pressure increases and the braking effect of the gas on the piston 3 is increased. In other words, when the piston 3 approaches either one of its end positions, the gas in either the combustion chamber 13 or the gas expansion chamber 15 is compressed and exerts a pressure on the piston head 7, 9 arranged therein, whereby said pressure stops the piston 3 from moving any further. The two gas expansion chambers 15 of the mirror imaged free-piston linear apparatus 1 is provided with a pressure equalization channel 27 which connects the two gas expansion chambers 15.

The free-piston linear apparatus 1 further comprises an exhaust vent 29 arranged to release exhaust gas from the combustion chamber 15 to an exhaust system 31. The exhaust vent 29 is a one-way controllable valve connecting the combustion chamber 13 to an exhaust channel 33 forming part of the exhaust system 31. The exhaust vent 29 is configured to open once the pistons 3 have been pushed apart as a result of the expanding gas inside the combustion chamber 13. Thus, the pressure from the expanding gas inside the combustion chamber 13 is first harnessed to displace the pistons 3, after which it is guided out through the exhaust vent 29. The exhaust system 31 further comprises a heat exchanger 35 configured to transfer residual heat from the exhaust gas to the gas expansion chamber 15. This is done in order to heat the gas expansion chamber 15 and reuse any waste heat from the combustion process. The heat exchanger 35 comprises a channel for guiding the exhaust gas (not shown) and preferably also means for improving the heat transfer rate between the exhaust gas and the heat exchanger (not shown). The heat exchanger 35 is connected to the outer wall 37 of the gas expansion chamber 15 and arranged such that heat may be transferred from the exhaust gas to the inner wall 39 of the gas expansion chamber 15.

The gas expansion chamber 15 comprises a gas inlet 41 for injecting gas into the gas expansion chamber 15 and a gas outlet 43 for releasing gas from the gas expansion chamber 15.

The free-piston linear apparatus 1 further comprises a linear generator arrangement 45 comprising a set of stator windings 47 arranged around the path of linear displacement, and one or more magnetic elements 49 mounted to said piston rod 11 in order to induce a current into said stator windings 47 during said linear displacement of said piston 3. The stator windings 47 are part of the inside wall 17 of the cylinder 5. The magnetic element 49 extends around the piston rod 11. For example, the magnetic element 49 can be a cylindrical magnet with a central through-hole 51 in which the piston rod 11 is arranged. The magnetic element 49 is firmly connected to the piston rod 11 such that when the piston 3 moves, the magnetic element 49 moves with it. Thus, when the piston heads 7, 9 are driven by a combustion in the combustion chamber 13 or by a gas spring effect from the gas expansion chamber 15, the magnetic element 49 moves back and forth in relation to the set of stator windings 47, thereby inducing a current therein.

The free-piston linear apparatus 1 further comprises a hydrogen storage tank 53. The hydrogen storage tank 53 is connected to the gas inlet 41 of the gas expansion chamber 15 via a first channel 55 and the gas outlet 43 of the gas expansion chamber 15 is connected to the combustion chamber 13 via a second channel 57. Hydrogen from the hydrogen storage tank 53 may also be transported to the combustion chamber 13 by means of a bypass channel 59 connecting the first channel 55 and the second channel 57. At the intersection between the first channel 55, the gas inlet 41, and the bypass channel 59, a T-port and a control valve 61 are provided. This T-port and this control valve 61 are configured to direct the flow of hydrogen from said first channel 55 and to either said gas inlet 41 or to said bypass channel 59. At the intersection between the bypass channel 59, the gas outlet 43, and the second channel 57, a T-port and a control valve 63 are provided. This T-port and this control valve 63 are configured to direct the flow of hydrogen from either said first gas outlet 43 or said bypass channel 59 and to said second channel 57.

In said gas expansion chamber 15, there is provided a temperature sensor 65 configured to determine a temperature of said gas expansion chamber 15. The temperature sensor is arranged on an inner wall 39 of the gas expansion chamber 15. By being able to measure the temperature of the gas expansion chamber 15, it is possible to control the flow of hydrogen so that hydrogen is directed into the gas expansion chamber 15 only once the gas expansion chamber 15 has reached a predetermined temperature. Thus, it is ensured that the hydrogen entering the gas expansion chamber 15 expands as much as is desired. Furthermore, the free-piston linear apparatus 1 comprises a control unit (not shown) configured to control an injection of hydrogen gas from said hydrogen storage tank 53 into the gas expansion chamber 15 and/or into the combustion chamber 13 based on input from a user, the temperature of the gas expansion chamber 15, and a position of the piston 3.

The free-piston linear apparatus 1 further comprises a liquid fuel tank 67. The liquid fuel tank 67 is connected to the combustion chamber 13. At the intersection between a channel 69 leading from the liquid fuel tank 67, the second channel 57, and the fuel inlet 71 of the combustion chamber 15, there is provided a T-port and a control valve 73. This T-port and this control valve 73 is configured to control what fuel enters the combustion chamber 13. Either hydrogen is taken from the second channel 57, or liquid fuel is taken from the liquid fuel tank 67. The control valve 73 is also configured to control the amount of fuel entering the combustion chamber 13. The combustion chamber 13 further comprises an air inlet 72 arrange to allow air to be injected into the combustion chamber 13, thus providing a mixture between fuel and oxygen which is beneficial for the combustion.

The second channel 57 is provided with a cooling element 75 arranged so that hydrogen exiting the gas expansion chamber 15 may be cooled before entering the combustion chamber 13.

Figure 2:
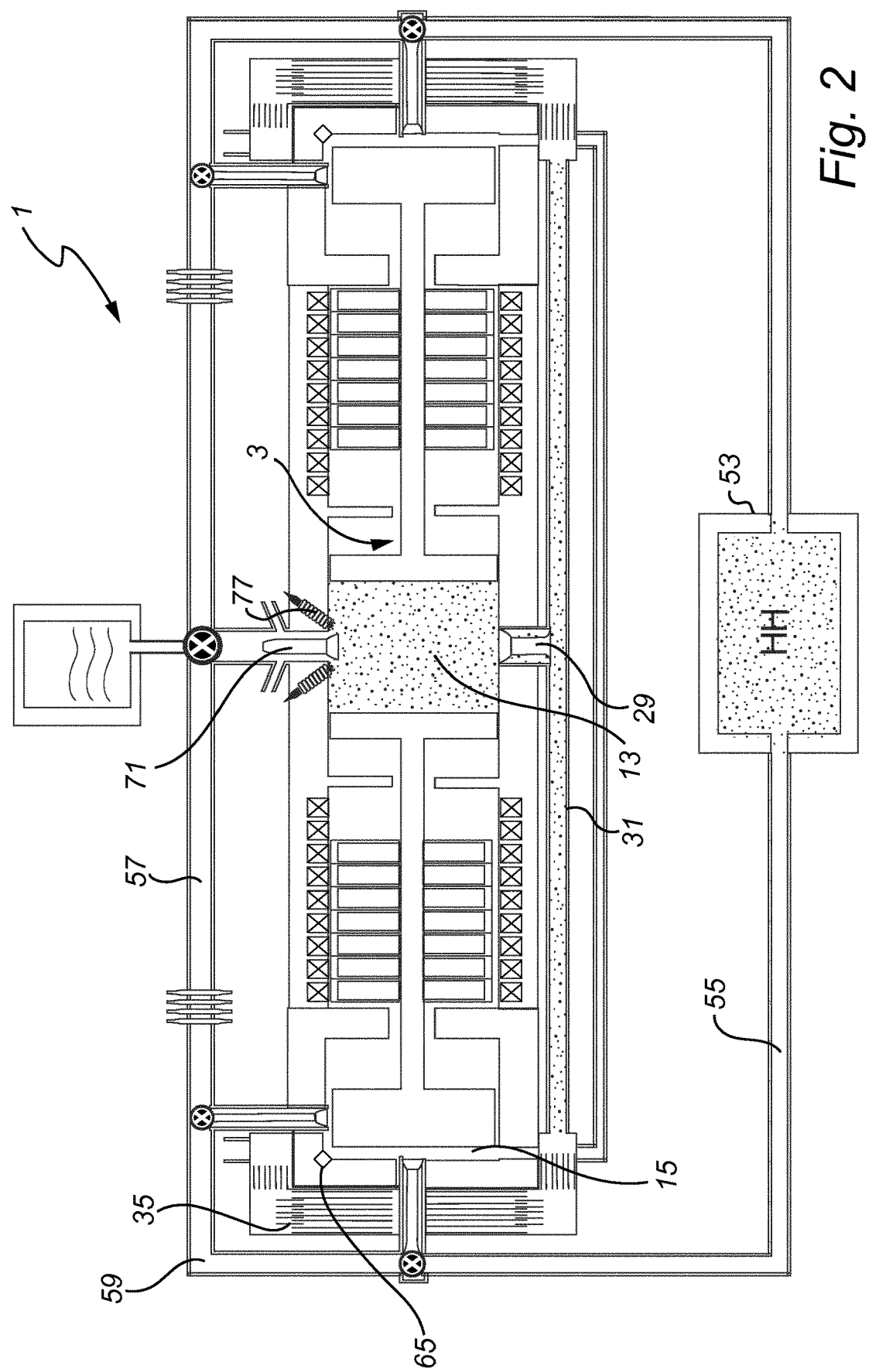
FIG. 2 is a schematic view of the free-piston linear apparatus of FIG. 1 illustrating a step of the combustion cycle.

FIG. 1-5 show an exemplary operating cycle of the free-piston linear apparatus 1. FIGS. 1 and 2 show hydrogen gas exiting the hydrogen gas tank 53 through, in order, the first channel 55, the bypass channel 59, the second channel 57 and into the combustion chamber 13 via the inlet 71 of the combustion chamber 13. Once the hydrogen gas is inside the combustion chamber 13, a spark plug 77 ignites the air/fuel mixture, thus causing the two pistons 3 of the free-piston linear apparatus 1 to move away from each other. In FIG. 2, the pistons 3 have moved to their most distal position, and the exhaust vent 29 has consequently been opened. The exhaust gas is guided through the exhaust system 31 to the heat exchangers 35 arranged in connection with either gas expansion chamber 15. As the exhaust gas passes the heat exchangers 35, the gas expansion chambers 15 are heated. The process described herein in relation to FIGS. 1 and 2 is repeated until the temperature sensors 65 senses that the gas expansion chambers 15 have reached a desired temperature.

Figure 3:
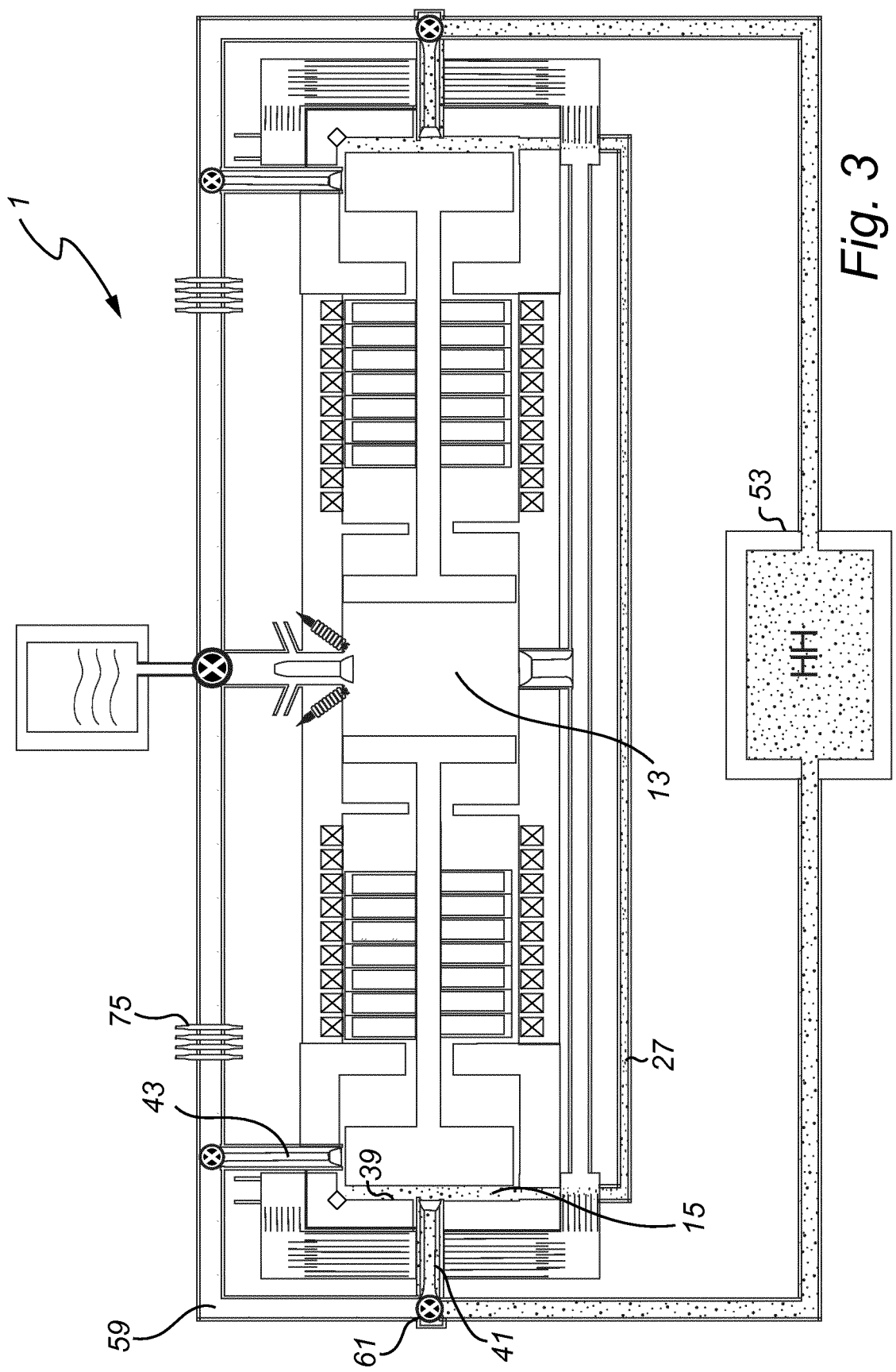
FIG. 3 is a schematic view of the free-piston linear apparatus of FIG. 1 illustrating a step of the combustion cycle.
Figure 4:
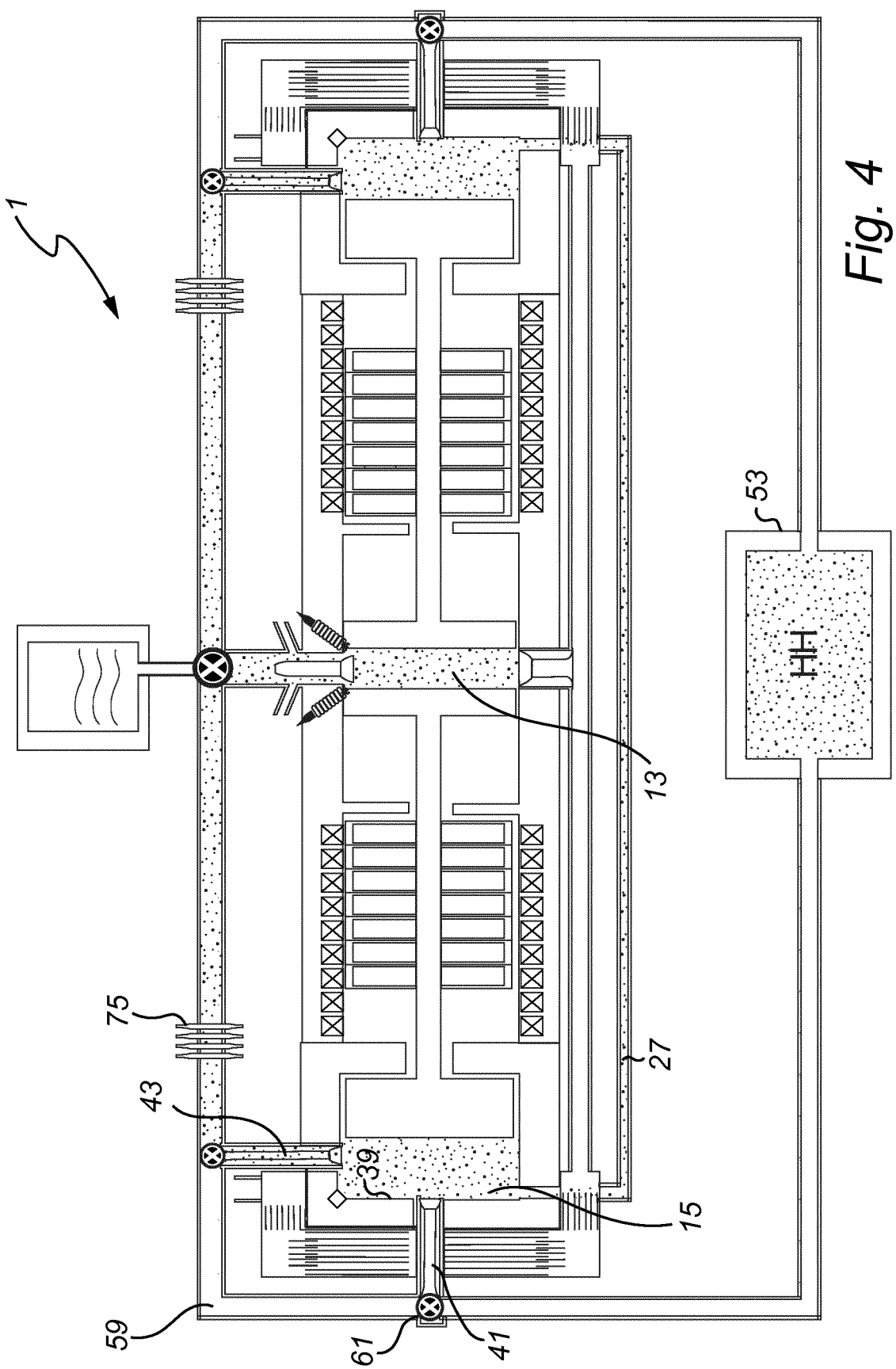
FIG. 4 is a schematic view of the free-piston linear apparatus of FIG. 1 illustrating a step of the combustion cycle.

FIGS. 3-4 show the hydrogen gas exiting the hydrogen tank 53 and entering gas expansion chambers 15, due to the T-ports 61 being arranged to guide the hydrogen away from the bypass channel 59 and to the inlet 41 of the gas expansion chamber 15 instead. While in the gas expansion chamber 15, the temperature of the inner walls 39 causes the hydrogen to expand. As the hydrogen expands, the outlet 43 of the gas expansion chamber 15 is kept closed and the pistons 3 are driven towards each other. The pressure equalization channel 27 ensures that the two pistons 3 are subjected to equal amounts of pressure. This enables synchronization of the movement of either piston 3, thus preventing undue imbalance of the movement of the free-piston linear arrangement 1. Once the pistons 3 have been driven to their most proximal position, the outlet 43 of the gas expansion chamber 15 is opened and the heated hydrogen gas is allowed to exit therethrough. As the heated hydrogen passes the cooling means 75, heat is dissipated and the hydrogen is cooled. After this, the hydrogen enters the combustion chamber 13 where it is combusted according to the process described in relation to FIG. 2 above. After combusting the hydrogen inside the combustion chamber 13, the steps described in relation to FIGS. 3-4 are repeated until the temperature of the gas expansion chamber 15 drops below a predetermined threshold. Once the temperature drops below this threshold, the steps described in relation to FIGS. 1-2 are repeated until the temperature rises above said threshold. In the embodiment described above, the temperature threshold for the gas expansion chamber is 350° C.

Figure 5:
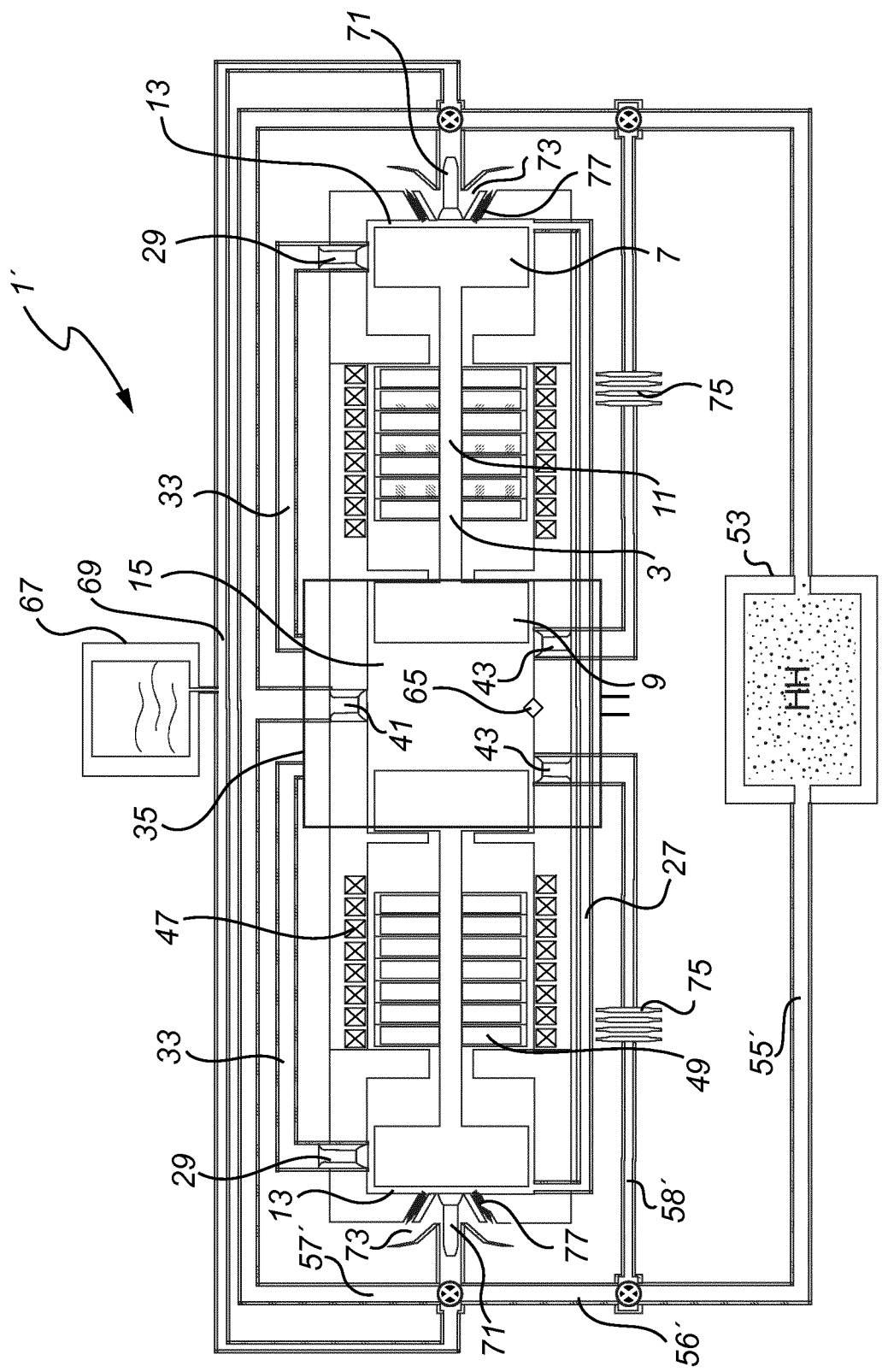
FIG. 5 is a schematic view of a free-piston linear apparatus according to one exemplary embodiment of the present invention.

FIG. 5 shows another exemplary embodiment of the present invention. Here, a schematic view of a free-piston linear apparatus 1' is shown. The free-piston linear apparatus 1' of FIG. 5 is similar to the free-piston linear apparatus 1 of FIGS. 1-4, with one exception being that the gas expansion chambers 15 of FIGS. 1-4 have changed place with the combustion chamber 13. Consequently, the free-piston linear apparatus 1' of FIG. 5 comprises two combustion chambers 13, one gas expansion chamber 15, two pistons 3 arranged between the gas expansion chamber 15 and the two combustion chambers 13, and one heat exchanger 35 arranged in connection with the gas expansion chamber. Further, during operation of the free-piston linear apparatus 1' of FIG. 5, the hydrogen gas exits the hydrogen gas tank 53 through, in order, the first channel 55', the second channel 56', and into the combustion chamber 13 via the inlet 71 of the combustion chamber 13. Once the hydrogen gas is inside the combustion chamber 13, a spark plug 77 ignites the air/fuel mixture, thus causing the two pistons 3 of the free-piston linear apparatus 1' to move towards each other. The pressure equalization channel 27 ensures that the two pistons 3 are subjected to equal amounts of pressure from the combustion in the combustion chambers 13. This enables synchronization of the movement of either piston 3, thus preventing undue imbalance of the movement of the free-piston linear arrangement 1 during its operation. After the pistons 3 have been moved towards each other, the pistons 3 are in their most proximal position, and the exhaust vents 29 are opened. The exhaust gas is then guided through the exhaust channels 33 to the heat exchanger 35 arranged in connection with the gas expansion chamber 15. As the exhaust gas passes the heat exchangers 35, the gas expansion chambers 15 are heated. This process is repeated until the temperature sensor 65 senses that the gas expansion chamber 15 has reached a desired temperature.

After a predetermined temperature has been sensed by the temperature sensor 65, the hydrogen gas exiting the hydrogen tank 53 instead enters the central gas expansion chamber 15. The hydrogen gas is guided there by means of T-ports and control valves similar to those discussed in relation to FIGS. 1-4. In other words, hydrogen gas exits the hydrogen gas tank 53, moves through the first channel 55', the second channel 56', the third channel 57' and into the gas expansion chamber 15 through the inlet 41. While in the gas expansion chamber 15, the temperature of the gas expansion chamber 15 causes the hydrogen to expand. As the hydrogen expands, the outlets 43 of the gas expansion chamber 15 are kept closed and the pistons 3 are driven away from each other. Once the pistons 3 have been driven to their most distal position, the outlets 43 of the gas expansion chamber 15 are opened and the heated hydrogen gas is allowed to exit therethrough. As the heated hydrogen passes the cooling means 75, heat is dissipated and the hydrogen is cooled. After this, the hydrogen enters the combustion chambers 13 where it is combusted according to the process described above. After combusting the hydrogen inside the combustion chambers 13, the steps of heating the hydrogen gas in the gas expansion chamber 15, cooling it with the cooling means 75 and combusting it in the combustion chambers 13 are repeated until the temperature of the gas expansion chamber 15 drops below a predetermined threshold. Once the temperature drops below this threshold, the steps of directly guiding the hydrogen gas from the hydrogen gas tank 53 to the combustion chambers 13 and guiding the exhaust gas from the combustion chambers 13 to the heat exchanger 35 are repeated until the temperature rises above said threshold. In the embodiment described above, this temperature threshold for the gas expansion chamber is 350° C.

Figure 6:
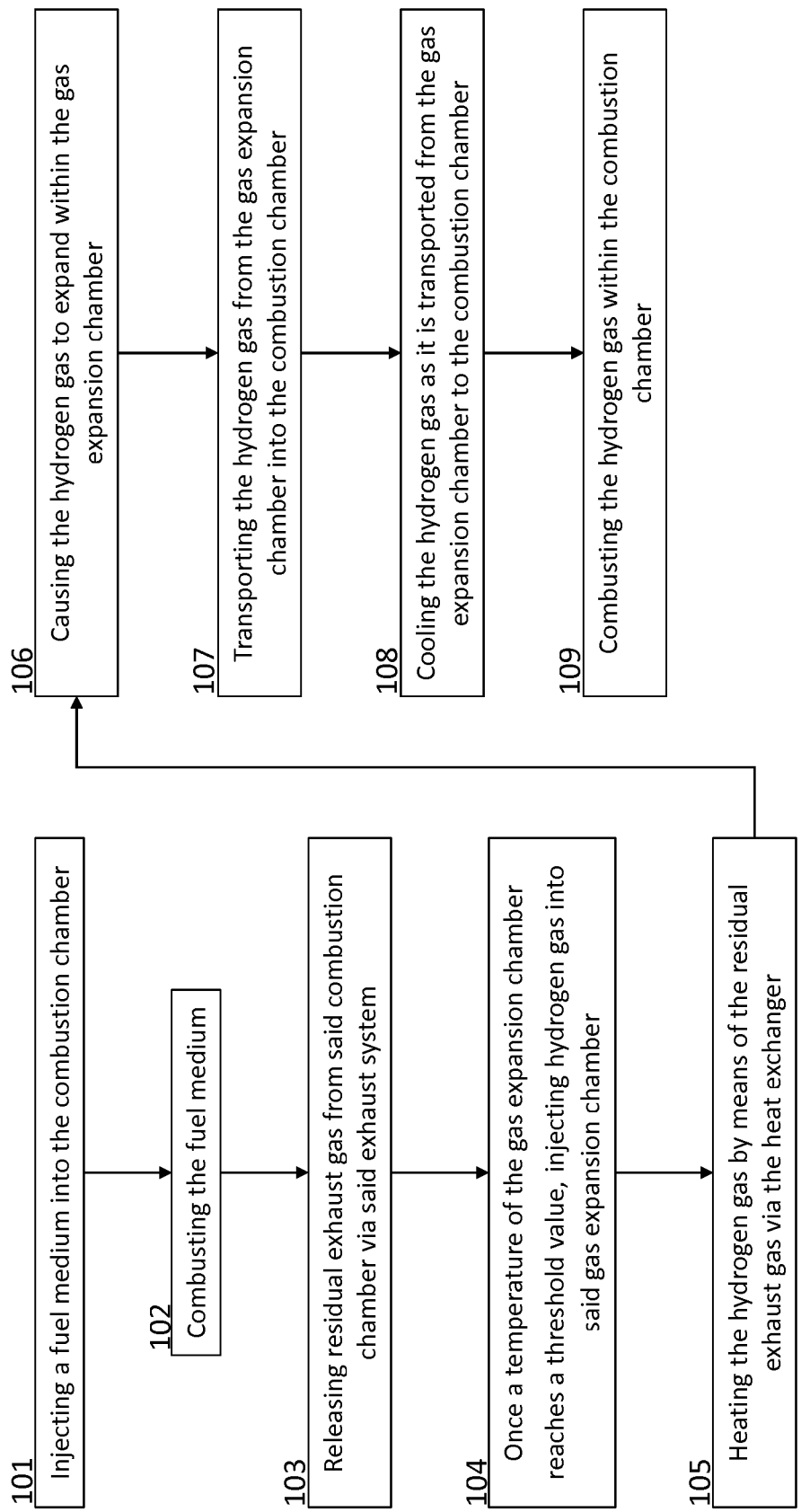
FIG. 6 is a flow-chart describing a method for operating a free piston linear apparatus according to one exemplary embodiment of the present invention.

FIG. 6 is a flow-chart describing a method for operating a free piston linear apparatus according to one exemplary embodiment of the present invention. The method comprises the steps of:

injecting 101 a fuel medium into the combustion chamber and causing 102 the fuel medium to expand in a combustion reaction within the combustion chamber in order to drive said piston toward said gas expansion chamber;

releasing 103 residual exhaust gas from said combustion chamber via said exhaust system;

once a temperature of the gas expansion chamber reaches a threshold value, injecting 104 hydrogen gas into said gas expansion chamber whereby the hydrogen gas is heated 105 by the residual exhaust gas via the heat exchanger of the exhaust system and caused 106 to expand within the gas expansion chamber in order to drive said piston back toward said combustion chamber;

transporting 107 hydrogen gas from said gas expansion chamber into the combustion chamber;

cooling 108 the hydrogen gas as it is transported from the gas expansion chamber to the combustion chamber; and causing 109 the hydrogen gas to expand in a combustion reaction within the combustion chamber in order to drive said piston toward the gas expansion chamber.

Even though the invention has been described with reference to specific exemplifying embodiments thereof, many different alterations, modifications and the like will become apparent for those skilled in the art. Variations to the disclosed embodiments can be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A free-piston linear apparatus, comprising:
a piston arranged within a cylinder, said piston being configured for linear displacement within the cylinder;
a combustion chamber arranged on one side of said piston and a gas expansion chamber arranged on an opposite side of said piston, wherein said piston is drivable under the action of a fuel medium expanding in the combustion chamber;
an exhaust vent arranged to release exhaust gas from the combustion chamber to an exhaust system, wherein said exhaust system comprises a heat exchanger configured to transfer residual heat from said exhaust gas to said gas expansion chamber in order to heat the gas expansion chamber; and
wherein said gas expansion chamber comprises at least one gas port for injecting and/or releasing gas into/from the gas expansion chamber
wherein said free-piston linear apparatus further comprises a hydrogen storage tank connected to said gas expansion chamber,
wherein said gas expansion chamber comprises a gas inlet and a gas outlet for supplying and releasing gas into/from the gas expansion chamber,
wherein said gas expansion chamber is connected to:
said hydrogen storage tank via said gas inlet, and
said combustion chamber via said gas outlet;
wherein said free-piston linear apparatus is arranged such that hydrogen is transported into said heated gas expansion chamber, in which the hydrogen expands, and wherein said hydrogen is subsequently transported into said combustion chamber, in which the hydrogen is combusted.

2. The free-piston linear apparatus according to claim 1, wherein said piston comprises a piston rod, and wherein said free-piston linear apparatus further comprises:
a linear generator arrangement comprising:
a set of stator windings arranged around the path of linear displacement, and
at least one magnetic element mounted to said piston rod in order to induce a current into said stator windings during said linear displacement of said piston.

3. The free-piston linear apparatus according to claim 1, further comprising a by-pass path from said gas inlet to said gas outlet such that hydrogen gas can be transported directly from said hydrogen tank to said combustion chamber and thereby bypass the gas expansion chamber.

4. The free-piston linear apparatus according to claim 1, wherein each of said gas outlet and said gas inlet comprises a control valve for directing a flow of hydrogen gas.

5. The free-piston linear apparatus according to claim 1, further comprising:
a temperature sensor configured to determine a temperature of said gas expansion chamber; and
a control unit configured to control an injection of hydrogen gas from said hydrogen storage tank into the gas expansion chamber based on at least one of an input from a user, the temperature of the gas expansion chamber, and a position of the piston.

6. The free-piston linear apparatus according to claim 5, wherein said control unit is configured to control an injection of hydrogen gas into the gas expansion chamber from the hydrogen storage tank once the temperature of the gas expansion chamber is above a predetermined threshold value.

7. The free-piston linear apparatus according to claim 1, further comprising a liquid fuel tank, wherein said liquid fuel tank is connected to said combustion chamber.

8. The free-piston linear apparatus according to claim 1, wherein said heat exchanger is arranged adjacent to the gas expansion chamber and configured to transfer heat to at least one wall of said gas expansion chamber.

9. The free-piston linear apparatus according to claim 1, further comprising cooling means arranged to cool hydrogen gas exiting said gas expansion chamber.

10. Method for operating a free piston linear apparatus according to claim 1, said method comprising:
injecting a fuel medium into the combustion chamber and causing the fuel medium to expand in a combustion reaction within the combustion chamber in order to drive said piston toward said gas expansion chamber;
releasing residual exhaust gas from said combustion chamber via said exhaust system;
injecting hydrogen gas into said gas expansion chamber whereby the hydrogen gas is heated by the residual exhaust gas via the heat exchanger of the exhaust system and caused to expand within the gas expansion chamber in order to drive said piston back toward said combustion chamber; and
transporting hydrogen gas from said gas expansion chamber into the combustion chamber and causing the hydrogen gas to expand in a combustion reaction within the combustion chamber in order to drive said piston toward the gas expansion chamber.

11. The method according to claim 10, wherein the step of injecting hydrogen gas into the gas expansion chamber is performed once a temperature of the gas expansion chamber reaches a threshold value.

12. The method according to claim 10, further comprising the step:
cooling the hydrogen gas as it is transported from the gas expansion chamber to the combustion chamber.

* * * * *